United States Patent [19]

Maeda

[11] 3,939,387
[45] Feb. 17, 1976

[54] VARIABLE FREQUENCY POWER CONVERTER FOR AC MOTOR DRIVE

[75] Inventor: Takeo Maeda, Hitachi, Japan
[73] Assignee: Hitachi, Ltd., Japan
[22] Filed: Apr. 19, 1974
[21] Appl. No.: 462,534

[30] Foreign Application Priority Data
Apr. 20, 1973  Japan.............................. 48-44172

[52] U.S. Cl. ...................... 318/227; 321/4; 321/10
[51] Int. Cl.² ............................................ H02P 5/40
[58] Field of Search .............. 321/2, 4, 5, 10, 45 C; 318/138, 227, 254, 439

[56] References Cited
UNITED STATES PATENTS
3,600,658   8/1971   Kuniyoshi .......................... 321/45 C
3,854,078  12/1974   Hubner............................... 318/227

Primary Examiner—William M. Shoop
Attorney, Agent, or Firm—Craig & Antonelli

[57] ABSTRACT

In a variable frequency power converter of a current type for driving an AC motor including a rectifier, an inverter, and a smoothing reactor disposed on a DC transmission line between the rectifier and the inverter, there are provided a series circuit having a switching circuit and a smoothing capacitor on the DC input side of the inverter and a feedback circuit having controlled rectifier elements and commutation reactors for feeding back the reactive power of the AC motor. The power converter operates as a current type converter until the output frequency of the converter reaches a predetermined value under the condition that the switching circuit and the controlled rectifier elements are non-conductive, and operates as a voltage type converter when the output frequency has reached the predetermined value under the condition that the switching circuit and the controlled rectifier elements are conductive.

7 Claims, 10 Drawing Figures

VARIABLE FREQUENCY POWER CONVERTER FOR AC MOTOR DRIVE

BACKGROUND OF THE INVENTION

1. Field of the Invention

The present invention relates to a power converter for driving an AC electric motor (induction motor, synchronous motor) utilizing an inverter, and more particularly to a power converter suitable for an electric motor requiring a wide range of speed change.

2. Description of the Prior Art

Ordinarily when a speed control of an AC motor is performed with an inverter as a driving power source, the inverter is classified into the following two types:

1. An inverter to the DC input side of which a smoothing reactor is connected and which functions as a current source to produce a rectangular output current. This is called a current type inverter. Since the direction of the current of this current type of inverter is always constant, the regenerative braking of the motor can easily be performed merely by reversing the polarity of the voltage to simplify the control circuit of the inverter itself. There is a further advantage that the motor can be stably started even from such a very low frequency as several Hz or a fraction of Hz. On the contrary, however, since the impedance as seen from the load side, i.e., the power source impedance is very high due to the fact that it functions as a power source, hunting is liable to occur at a steady running time which is the most serious problem to the operation of the motor. In particular, the hunting is liable to occur at such a high frequency of steady running as several hundreds of Hz. This phenomenon is more pronounced when a number of motors are running in parallel.

2. An inverter to the DC input side of which a smoothing capacitor is connected and which functions as a voltage source to produce a rectangular output voltage. This is called a voltage type inverter. Since this voltage type inverter functions as a voltage source, the power source impedance is very low, so that it has the advantage that unlike the current type inverter the hunting does not occur to enable the motor to run stably. On the contrary, however, the inrush current at the starting time of the motor cannot be suppressed to hunder a stable start of the motor. In particular, a stable start of the motor from such a very low frequency as several Hz or a fraction of Hz cannot be done.

Thus, when the speed control range of the motor, i.e., the output frequency range (the ratio of the maximum frequency to the minimum frequency) of the inverter is about several times, even the voltage type inverter can sufficiently satisfy the specification thereof. However, if the range is extended to about several tens of times to start the motor from such a very low frequency as several Hz or a fraction of Hz (minimum frequency), a stable start cannot be done with the voltage type inverter. In this case the current type inverter is preferable also from the standpoint of suppressing the inrush current at the starting time. However, the current type inverter has the difficulty in the stability of the steady running, while the voltage type inverter is preferable from the standpoint of the stability of the steady running.

Consequently, in the past, when the motor was to be run at such a speed control range as described above, two inverters of the current type and the voltage type had to be prepared so that they could be changed-over as required. As a result, the system became expensive.

SUMMARY OF THE INVENTION

An object of the present invention is to provide an inexpensive power converter for driving an AC electric motor capable of effecting a stable control of an AC motor even at a wide speed control range with one inverter having the combined function of the voltage type inverter and the current type inverter.

The feature of the power converter according to the present invention is that it comprises a converter connected to an AC power source for converting an AC power into a desired DC power, a smoothing reactor for smoothing the DC output of the converter, an inverter for receiving the DC output smoothed by the smoothing reactor and for producing a rectangular output current of a desired frequency, an AC motor driven by the inverter, a series circuit connected to the inverter on its DC input side and consisting of a switching circuit and a smoothing capacitor which operates, when the output frequency of the inverter has reached a predetermined value, to compose a smoothing circuit with the smoothing reactor, and a feedback circuit consisting of controlled rectifier elements and commutation reactors which operates, when the output frequency of the inverter has reached the predetermined value, to feedback the reactive power of the AC motor.

DESCRIPTION OF THE PREFERRED EMBODIMENTS

Figure 1A:
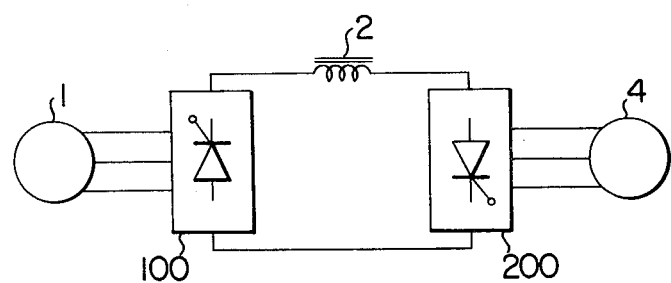
FIG. 1a is a schematic diagram of a prior art power converter for driving an electric motor utilizing a current type inverter.

As preliminaries to a description of the present invention conventional power converters employing a current type inverter and a voltage type inverter will first be described with reference to FIGS. 1a and 1b, respectively. In FIG. 1a reference numeral 1 designates a three-phase AC power source, and reference numeral 100 designates a converter for converting the alternating current of the three-phase AC source into a desired direct current and composed of, for example, a three-phase bridge of thyristors. Reference numeral 2 designates a smoothing reactor for smoothing the DC output from the converter 100. Reference numeral 200 designates a current type of inverter for receiving the DC output smoothed by the smoothing reactor 2 and for producing a rectangular output current of a desired frequency and composed of, for example, a three-phase bridge of thyristors. Refrence numeral 4 designates an AC motor driven by the current type inverter 200.

Figure 1B:
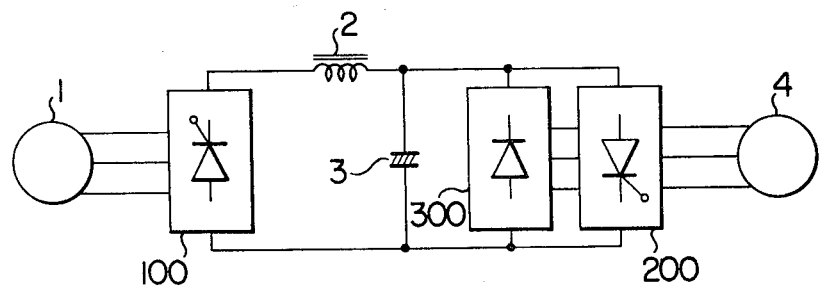
FIG. 1b is a schematic diagram of a prior art power converter for driving an electric motor utilizing a voltage type inverter.

Also in the power converter shown in FIG. 1b the alternating current from the three-phase AC power source 1 is converted into a desired direct current by the converter 100 similarly in FIG. 1a. The DC output of the converter 100 is smoothed by a smoothing circuit consisting of the smoothing reactor 2 and a smoothing capacitor 3 and converted into an alternating current having a desired frequency by the inverter 200 to be supplied to the AC motor 4. The inverter 200 is composed of a three-phase bridge of thyristors similarly to the inverter 200 in FIG. 1a. A feedback circuit 300 is composed of diodes and feeds the reactive power of the inverter 200 back to the DC input side of the inverter 200 at the time of commutation of the inverter 200. Consequently, though the circuit structure of the inverter 200 is similar to that of the current type inverter 200 in FIG. 1a, the AC output thereof is a rectangular output voltage.

As described above, though the structures of the inverters 200 in FIGS. 1a and 1b are similar to each other, the controlled AC output of the one is a current while that of the other is a voltage. This difference results, as will be easily understood, from the following differences:

1. Whether or not the feedback circuit 300 composed of diodes is present, and
2. Whether or not the smoothing capacitor 3 is present.

A further difference is, though not clearly shown in FIGS. 1a and 1b, the difference in the commutation scheme of the inverter, that is, whether or not the commutation reactor is present. The current type inverter is a kind of parallel inverter and commutates the load current to another thyristor by utilizing the energy charged on the commutation capacitor. This is commonly called capacitor commutation. In contrast, the voltage type inverter commutates the energy charged on the commutation capacitor by producing commutation impulses by utilizing an oscillating current due to the commutation reactor and the commutation capacitor. This is commonly called impulse commutation.

From these differences in the structure the above-described contradictory problems arise when the speed control range of the AC motor is extended.

The present invention is intended to make an inverter to have both functions of the current type and the voltage type to provide the features of both types of inverters.

Figure 2:
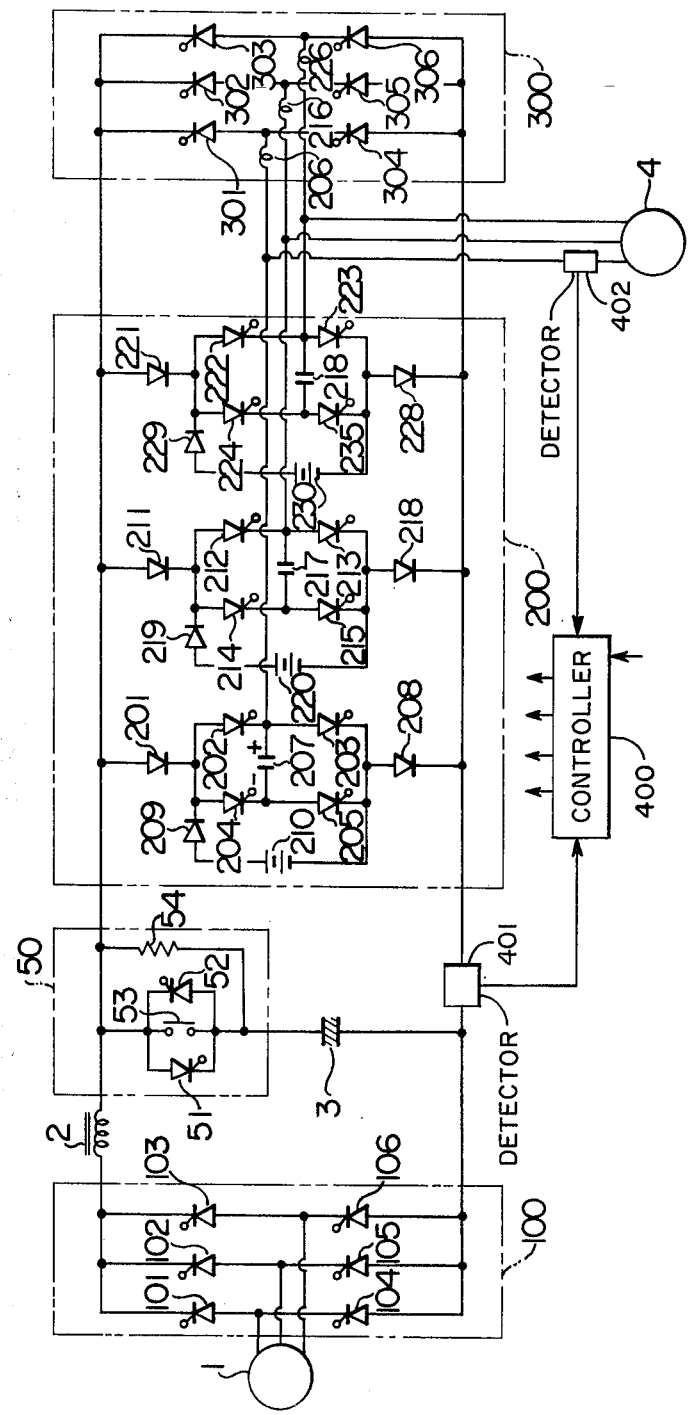
FIG. 2 is an embodiment of the power converter for driving an electric motor according to the present invention.

FIG. 2 is an embodiment of the present invention. In FIG. 2 the parts performing the same functions as those in FIGS. 1a and 1b are designated by the same reference numerals as in FIGS. 1a and 1b. The converter 100 consists of six thyristors 101 to 106. By controlling the ignition phases of the thyristors 101 to 106 the alternating current from the three-phase AC power source can be converted into a desired direct current. The smoothing reactor 2 smooths the ripple component of the DC output of the converter 100. The smoothing capacitor 3 performing a similar function to that of the smoothing reactor 2 is connected to one terminal of the DC input side of the inverter 200 through a switching circuit 50. The switching circuit 50 is composed of thyristors 51 and 52, a contactor 53 and a shunt resistor 54. The inverter 200 which shows the detail of the inverter 200 in FIGS. 1a and 1b consists of three parallel arms including parts 201 to 210, 211 to 220, and 221 to 230, respectively. A first arm is composed of series diodes 201 and 208, principal thyristors 202 and 203, auxiliary thyristors 204 and 205, a commutation capacitor 207, a power source 210 for supplementarily charging the commutation capacitor 207, and a reversecurrent checking diode 209. The same is true also with the other arms.

Considering the structure of the inverter 200 per se, when it is to be operated as of the voltage type as shown in FIG. 1b, it is sufficient to replace the commutation capacitor 207 in FIG. 2 by a commutation reactor and a commutation capacitor apart from the feedback circuit 300.

The feedback circuit 300 for feeding back the reactive power of the AC motor 4 consists of thyristors 301 to 306 and commutation reactors 206, 216, and 226. The commutation reactors 206, 216, and 226 are for the arms consisting of the parts 201 to 210, 211 to 220, and 221 to 230, respectively, of the inverter 200. The reason why the commutation reactors 206, 216, and 226 are put on the side of the feedback circuit 300 is due to the above-described difference in the commutation scheme of the inverter.

Though the control circuits of the converter 100 and the inverter 200 are not diagrammatically illustrated, when the AC motor 4 is an induction motor, for example, the converter 100 and the inverter 200 are individually controlled so that the ratio between the terminal voltage and the operation frequency of the induction motor becomes constant. In this case the DC output voltage of the converter 100 determines the terminal voltage of the induction motor and the output frequency of the inverter 200 determines the operation frequency of the motor. For example, a controller 400 responsive to signals from detectors 401 and 402 and a signal indicative of the output frequency of the inverter 200 may provide the control for the circuits as is known in the art.

Next, how to operate the power converter constructed in this manner as a current type inverter at a low speed range of from the start to a predetermined frequency, for example a fraction of the maximum frequency, and as a voltage type inverter at the succeeding high speed range to make the most of the advantages of both types of inverters will be described.

First, the case in which it is operated as a current type inverter will be described. The switching circuit 50 is assumed to be in the off state. Then, the thyristors 51 and 52 are non-conductive, and at the same time the contactor 53 is in the off state. Also, the thyrstors 301 to 306 of the feedback circuit 300 are in the non-conductive state so that the feedback circuit 300 is in the off state. Though the smoothing capacitor 3 is charged through the shunt resistor 54 of the switching circuit 50 with a time constant determined by the shunt resistor 54 and the smoothing capacitor 3, the current flowing from the smoothing capacitor 3 into the inverter 200 can be regarded as zero until the terminal voltage of the smoothing capacitor 3 becomes equal to the average value of the DC output voltage of the converter 100, that is, the DC input voltage of the inverter 200.

Consequently, if the switching circuit 50 and the feedback circuit 300 are in the off state, the power converter of FIG. 2 comes of the same construction as that of FIG. 1a so that the inverter 200 operates as the current type.

Here, the commutating operation when the inverter 200 functions as the current type will be described as regards the arm on the side of the principal thyristors 202 and 203 as an example. It is assumed that the principal thyristor 202 is conducting and the commutation capacitor 207 is charged positive on the cathode side of the principal thyristor 202 as shown in FIG. 2. When the path of the load current to the AC motor 4 is to be changed by extinguishing the principal thyristor 202 and by conducting the principal thyristor of another arm, the auxiliary thyristor 204 and the principal thyristor of the other arm to be conducted are conducted. By conducting the auxiliary thyristor 204 the energy charged on the commutation capacitor 207 is discharged through the path: principal thyristor 202 → auxiliary thyristor 204 → commutation capacitor 207 to backwardly bias the principal thyristor 202 so that the principal thyristor 202 is extinguished. Then, the load current is shunted to the path: auxiliary thyristor 204 → commutation capacitor 207 → AC motor 4, so that the commutation capacitor 207 is charged in the opposite polarity to that illustrated. On the other hand, since the principal thyristor of the other arm is conducting simultaneously with the conduction of the auxiliary thyristor 204, the load current flows through this principal thyristor. Then, the load current flowing through the auxiliary thyristor 204 decreases to zero so that the auxiliary thyristor 204 is extinguished. By the extinction of the auxiliary thyristor 204 the load current all flows through the principal thyristor of the other arm to complete the commutation. When the charging voltage of the commutation capacitor 207 becomes deficient by this commutation, the supplementary power source 210 supplementarily charges the commutation capacitor 207 by the amount of the deficiency by conducting the auxiliary thyristor 204 when the principal thyristor 203 becomes conducting.

Since the power converter of FIG. 2 operates as a current source in this manner, the inrush current of the AC motor 4 at the starting time can be suppressed and, at the same time, the motor can be stably started even from a frequency near zero such as several Hz or a fraction of Hz of the minimum starting frequency.

The case in which the inverter 200 is operated as a voltage type inverter will next be described. In this case, since the smoothing capacitor 3 is being charged through the shunt resistor 54 while the inverter 200 is operating as a current type inverter, the smoothing capacitor 3 is charged to the extent that the terminal voltage thereof is approximately equal to the average value of the DC input voltage of the inverter 200. Of course the time constant of the shunt resistor 54 and the smoothing capacitor 3 has to be determined considering the timing of switching from the current type to the voltage type.

In this state the switching circuit 50 becomes on, that is, the thyristors 51 and 52 become conducting to short-circuit the shunt resistor 54, and after the lapse of a short time the contactor 53 turns off. As a result, the smoothing capacitor 3 is connected in parallel to the DC input side of the inverter 200 to compose a smoothing circuit with the smoothing reactor 2.

On the other hand, simultaneously with the switching circuit turning on, the thyristors 301 to 306 of the feedback circuit 300 become conducting to turn on the feedback circuit 300.

Consequently, the power converter of FIG. 2 becomes the same construction as that of the FIG. 1b so that it operates as a voltage source.

Here, the commutating operation when the inverter 200 functions as the voltage type will be described as regards the arm on the side of the principal thyristors 202 and 203 as an example. Assume that the principal thyristor 202 is conducting and the commutation capacitor 207 is charged positive on the cathode side of the principal thyristor 202 as shown in FIG. 2. When the path of the load current to the AC motor 4 is to be changed by extinguishing the principal thyristor 202 and by conducting the principal thyristor of another arm, the auxiliary thyristor 204 and the principal thyristor of the other arm to be conducted are conducted. By conducting the auxiliary thyristor 204 the energy charged on the commutation capacitor 207 is discharged through the path: principal thyristor 202 → auxiliary thyristor 204 → commutation capacitor 207 to backwardly bias the principal thyristor 202 so that the principal thyristor 202 is extinguished. Then, since the thyristors of the feedback circuit 300 are conducting, the energy charged on the commutation capacitor 207 is discharged through the path: commutation reactor 206 → thyristor 301 → series diode 201 → auxiliary thyristor 204 → commutation capacitor 207, so that the commutation capacitor 207 is charged in the opposite polarity to that illustrated. In this case the principal thyristor 202 is backwardly biased by the voltage drop component due to the commutation reactor 206 and the thyristor 301 of the feedback circuit 300. Next, when the commutation current flowing through the feedback thyristor 301 becomes zero, the load current comes to flow through the thyristor 304 so that the energy stored in the AC motor 4, i.e., the reactive power is fed back to the converter 100 side. In this manner the load current having been flowing through the principal thyristor 202 is commutated to the principal thyristor of the other arm to complete the commutation. Of course, when the charging voltage of the commutation capacitor 207 is deficient, it is supplementarily charged by the supplementary power source 210 similarly in the case in which the inverter 200 operates as the current type described above.

Consequently, by operating the power converter of FIG. 2 as a voltage source the speed control of the AC motor at the high speed range can be performed stably, and the occurrence of such a problem as hunting can be prevented.

In FIG. 2 the switching circuit 50 is provided with the shunt resistor 54 to gradually charge the smoothing capacitor 3 while the inverter 200 is operating as the current type. This is because it is intended to suppress the inrush current flowing into the smoothing capacitor 3 when the inverter 200 is changed over from the current type to the voltage type and to carry out the changeover smoothly by suppressing the momentary drop of the DC input voltage of the inverter 200. The number of the shunt resistor 54 is not necessarily one as in FIG. 2, but a plurality of shunt resistors may be connected in parallel so that the value of the resistance can be changed with the lapse of time.

Also, the contactor 53 in the switching circuit 50 is not necessarily required, but it is effective to the time rating of the thyristors 51 and 52 and the anti-sparking property.

Next, modifications of the switching circuit 50 and the feedback circuit 300 in FIG. 2 will be described referring to FIGS. 3 to 8.

Figure 3:
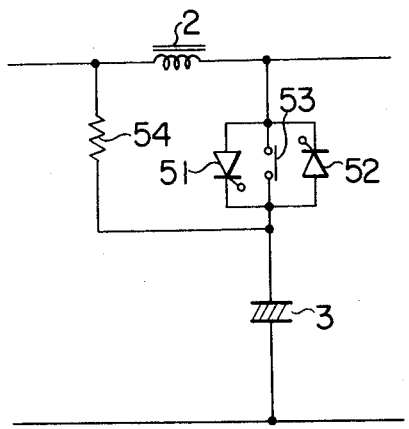
FIGS. 3 to 8 are modifications of parts of the system of FIG. 2.
Figure 4:
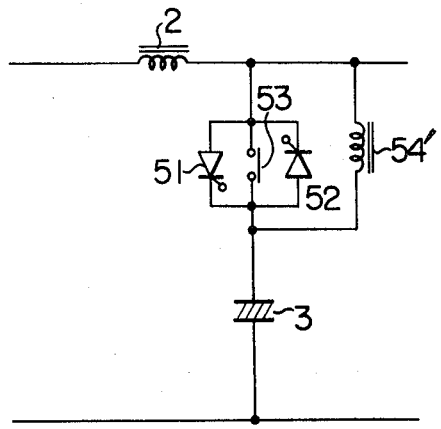

FIGS. 3 to 6 are modifications of the switching circuit 50. In FIG. 3 one terminal of the shunt resistor 54 which was connected in FIG. 2 between the output side of the smoothing reactor 2 and the DC input side of the inverter 200 is connected between the DC output side of the converter 100 and the input side of the smoothing reactor 2. FIG. 4 is an example in which the shunt resistor 54 in FIG. 2 is replaced by an inductance 54'.

Figure 5:
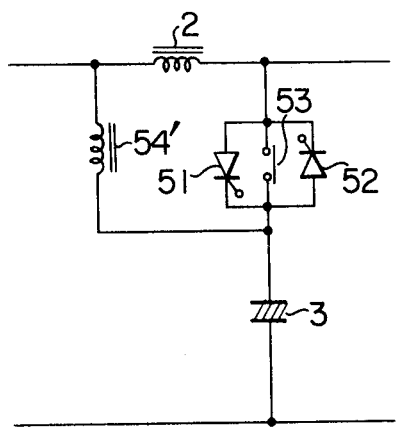

FIG. 5 is an example in which the shunt resistor 54 in FIG. 3 is replaced by an inductance 54'. As can be seen from the modifications of FIGS. 3 to 5 the selection of the element and the connection thereof can be made arbitrarily so far as the inrush current into the smoothing capacitor 3 and the momentary drop of the DC input voltage of the inverter 200 occurring when the inverter 200 is changed over from the current type to the voltage type are suppressed.

Figure 6:
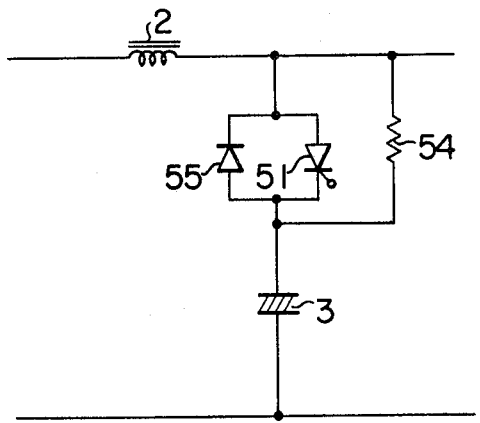

FIG. 6 is an example in which the thyristor 52 in the switching circuit 50 in FIG. 2 in the discharging direction of the energy on the smoothing capacitor 3 is replaced by a diode 55 and the contactor 53 is removed.

Figure 7:
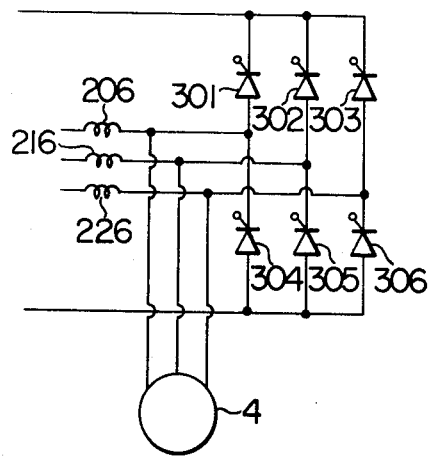
Figure 8:
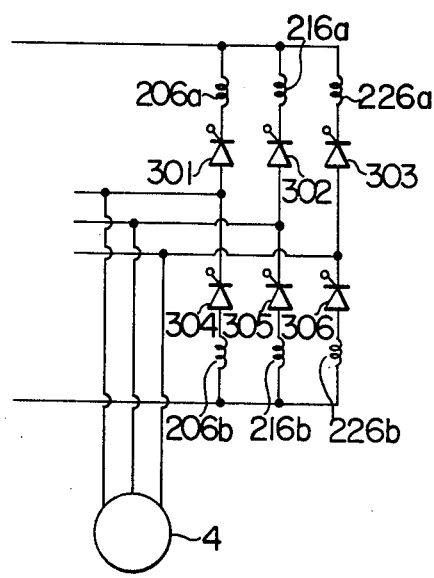

FIGS. 7 and 8 are modifications of the feed-back circuit 300 in FIG. 2. In FIG. 7 the commutation reactors 206, 216, and 226 are connected between the AC output side of the inverter 200 and the AC input side of the AC motor 4 so that the effective current flowing into the motor 4 flows through the commutation reactors. In FIG. 8 the commutation reactors 206, 216, and 226 in FIG. 2 are divided into reactors 206a and 206b, 216a and 216b, 226a and 226b which are connected in series with the thyristors 301 and 304, 302 and 305, 303 and 306, respectively.

As has been described above, according to the present invention one inverter has both functions of the current type and the voltage type and is operated as the current type at the low speed range of the AC motor while it is operated as the voltage type at the high speed range so that the motor can be operated stably over a wide speed range.

In enabling one inverter to have both functions of the current type and the voltage type the current type function can be had by additionally providing a few circuits, while the voltage type function can be had by slightly changing the circuits. Consequently, it is less expensive than employing two inverters of the current type and the voltage type.

The circuit structure of the inverter is not limited to the above embodiments but other various changes are possible.

Figure 9:
FIG. 9 is a block diagram illustration of a power inverter in accordance with the present invention for driving a number of AC motors connected in parallel.

The present invention can be applied also to the case in which a number of AC motors are run in parallel as is illustrated in FIG. 9. In particular, since, when the inverter is operating as a voltage type one, the impedance as seen from the load side of the voltage type inverter is low, the hunting phenomenon due to the load fluctuation can be suppressed.

I claim:

1. A power converter for driving an AC electric motor comprising a converter connected to an AC power source for converting an AC power into a desired DC power, a smoothing reactor for smoothing the DC output of the converter, an inverter for receiving the DC output smoothed by the smoothing reactor and for producing a rectangular output current of a desired frequency, an AC motor driven by the inverter, a series circuit connected to the inverter on its DC input side and consisting of a switching circuit and a smoothing capacitor which operates, when the output frequency of the inverter has reached a predetermined value, to compose a smoothing circuit with the smoothing reactor, and a feedback circuit consisting of controlled rectifier elements and commutation reactors which operates, when the output frequency of the inverter has reached the predetermined value, to feedback the reactive power of the AC motor.

2. A power converter for driving an AC motor according to claim 1, in which the switching circuit comprises switching means including controlled rectifying elements and an impedance element connected in parallel with the switching means and the smoothing capacitor is adapted to be charged through the impedance element when the switching means is not operating.

3. A power converter for driving an AC motor according to claim 2, in which the impedance of the impedance element is selected such that the charging voltage of the smoothing capacitor becomes approximately equal to the average value of the DC input voltage of the inverter at the operating time of the switching means.

4. A power converter for driving an AC motor according to claim 1, in which one terminal of each of the commutation reactors of the feedback circuit is connected to the controlled rectifying element side and the other terminal thereof is connected to the AC input side of the AC motor.

5. A power converter for driving an AC motor according to claim 1, in which one terminal of each of the commutation reactors of the feedback circuit is connected to the AC output side of the inverter and the other terminal thereof is connected to the AC input side of the AC motor.

6. A power converter for driving an AC motor according to claim 1, in which a number of AC motors are connected in parallel.

7. A power converter for driving an AC electric motor comprising a converter connected to an AC power source for converting an AC power into a desired DC power, a smoothing reactor for smoothing the DC output of the converter, an inverter means for receiving the DC output smoothed by the smoothing reactor and for producing the rectangular output current of a desired frequency at least during start up of an AC motor, an AC motor driven by the inverter means, and control means for controlling the inverter means when the output frequency of the inverter means has reached a predetermined value so that the inverter means produces a rectangular output voltage, the control means including a series circuit connected to the inverter means on its DC input side and consisting of a switching circuit and a smoothing capacitor for forming a smoothing circuit when the output frequency of the inverter means reaches the predetermined value, and a feedback circuit consisting of controlled rectifier elements and commutation reactors for feeding back the reactive power of the AC motor when the output frequency has reached the predetermined value.

* * * * *